(12) United States Patent
Imai

(10) Patent No.: US 9,097,965 B2
(45) Date of Patent: Aug. 4, 2015

(54) IMAGE PROJECTION DEVICE, IMAGE PROJECTION METHOD, AND IMAGE DISPLAY DEVICE

(75) Inventor: Hiroshi Imai, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 450 days.

(21) Appl. No.: 13/502,030

(22) PCT Filed: Oct. 4, 2010

(86) PCT No.: PCT/JP2010/067339
§ 371 (c)(1),
(2), (4) Date: Apr. 13, 2012

(87) PCT Pub. No.: WO2011/046034
PCT Pub. Date: Apr. 21, 2011

(65) Prior Publication Data
US 2012/0200833 A1    Aug. 9, 2012

(30) Foreign Application Priority Data

Oct. 15, 2009    (JP) ................. 2009-238088

(51) Int. Cl.
| | |
|---|---|
| G03B 21/26 | (2006.01) |
| G03B 21/28 | (2006.01) |
| G01B 11/28 | (2006.01) |
| G02B 26/08 | (2006.01) |
| G02B 26/02 | (2006.01) |
| H04N 3/02 | (2006.01) |
| G03B 21/14 | (2006.01) |

(Continued)

(52) U.S. Cl.
CPC *G03B 21/14* (2013.01); *G02B 3/08* (2013.01);
*G02B 15/00* (2013.01); *G02B 27/104*
(2013.01); *G02B 27/144* (2013.01); *G02B 27/145* (2013.01); *G02B 27/48* (2013.01)

(58) Field of Classification Search
CPC ........ G02B 3/08; G02B 15/00; G02B 27/104; G02B 27/48; G03B 2207/00; H04N 9/3129
USPC ................ 353/30, 85, 98; 356/607, 608, 629; 345/3.2; 359/17, 202.1, 234, 298; 348/195
See application file for complete search history.

(56) References Cited

U.S. PATENT DOCUMENTS

| | | | |
|---|---|---|---|
| 2003/0011751 A1 | 1/2003 | Sakata et al. | |
| 2004/0104902 A1* | 6/2004 | Fujii et al. ................... | 345/204 |

(Continued)

FOREIGN PATENT DOCUMENTS

| | | |
|---|---|---|
| CN | 101646976 A | 2/2010 |
| CN | 101809494 A | 8/2010 |

(Continued)

OTHER PUBLICATIONS

Communication dated May 19, 2015, issued by the State Intellectual Property Office of the People's Republic of China in corresponding Chinese Application No. 20140105194.1.

*Primary Examiner* — William C Dowling
*Assistant Examiner* — Magda Cruz
(74) *Attorney, Agent, or Firm* — Sughrue Mion, PLLC

(57) ABSTRACT

An image projection device includes beam generation means that emits a plurality of beams in one direction such that the plurality of beams are superimposed each other, a convergence angle of each beam being different from each other; and scanning means that scans projection surface with the beams emitted from beam generation means.

15 Claims, 16 Drawing Sheets

(51) Int. Cl.
  *G02B 3/08* (2006.01)
  *G02B 15/00* (2006.01)
  *G02B 27/10* (2006.01)
  *G02B 27/14* (2006.01)
  *G02B 27/48* (2006.01)

(56) References Cited

U.S. PATENT DOCUMENTS

2007/0035704 A1  2/2007  Akiyama
2009/0033884 A1* 2/2009  Yonekubo et al. ............... 353/85

FOREIGN PATENT DOCUMENTS

| JP | 2007-72435 A | 3/2007 |
| JP | 2007-121538 A | 5/2007 |
| JP | 2007-121539 A | 5/2007 |
| JP | 2008-203888 A | 9/2008 |
| JP | 2008-209709 A | 9/2008 |
| JP | 2009-98544 A | 5/2009 |
| JP | 2009-232308 A | 10/2009 |

* cited by examiner

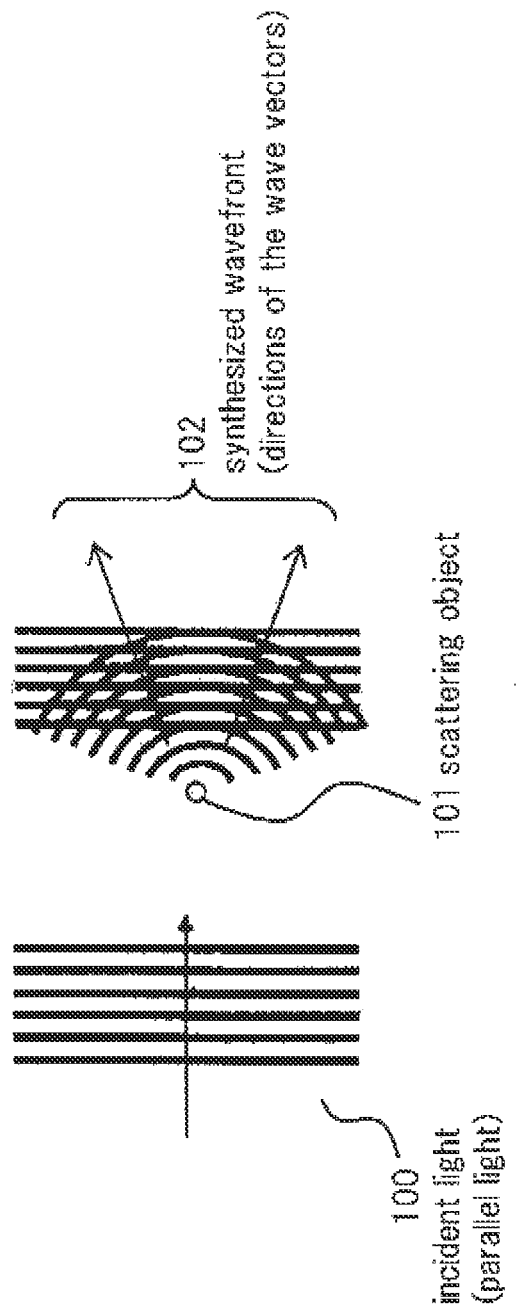

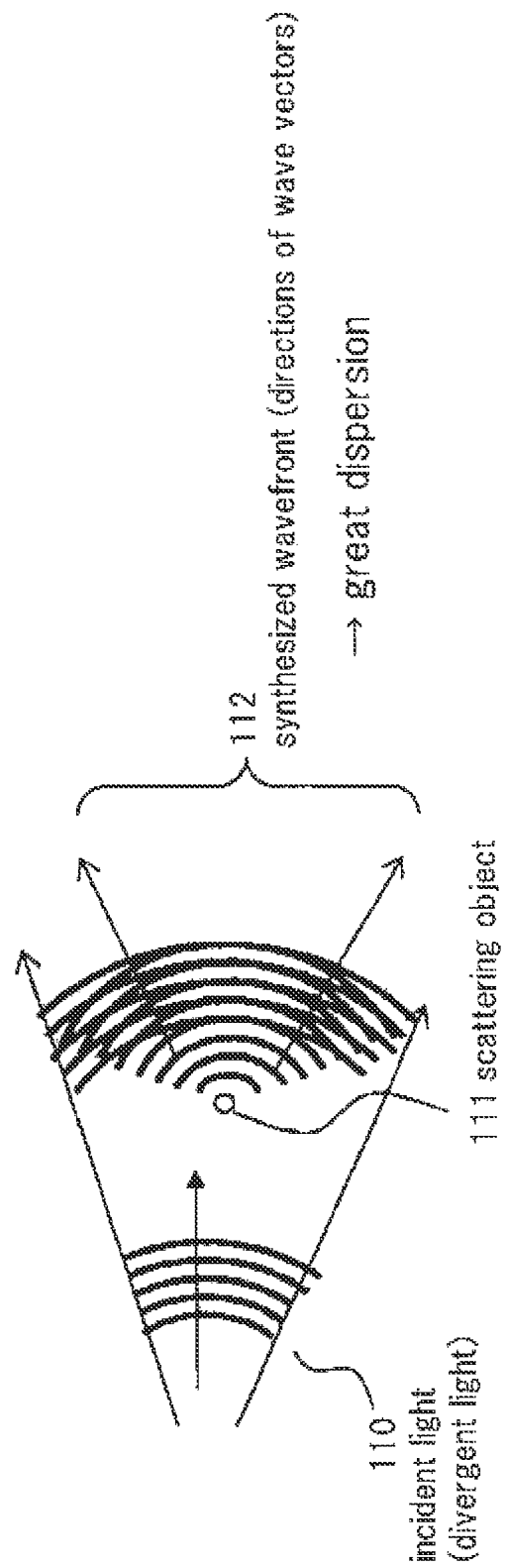

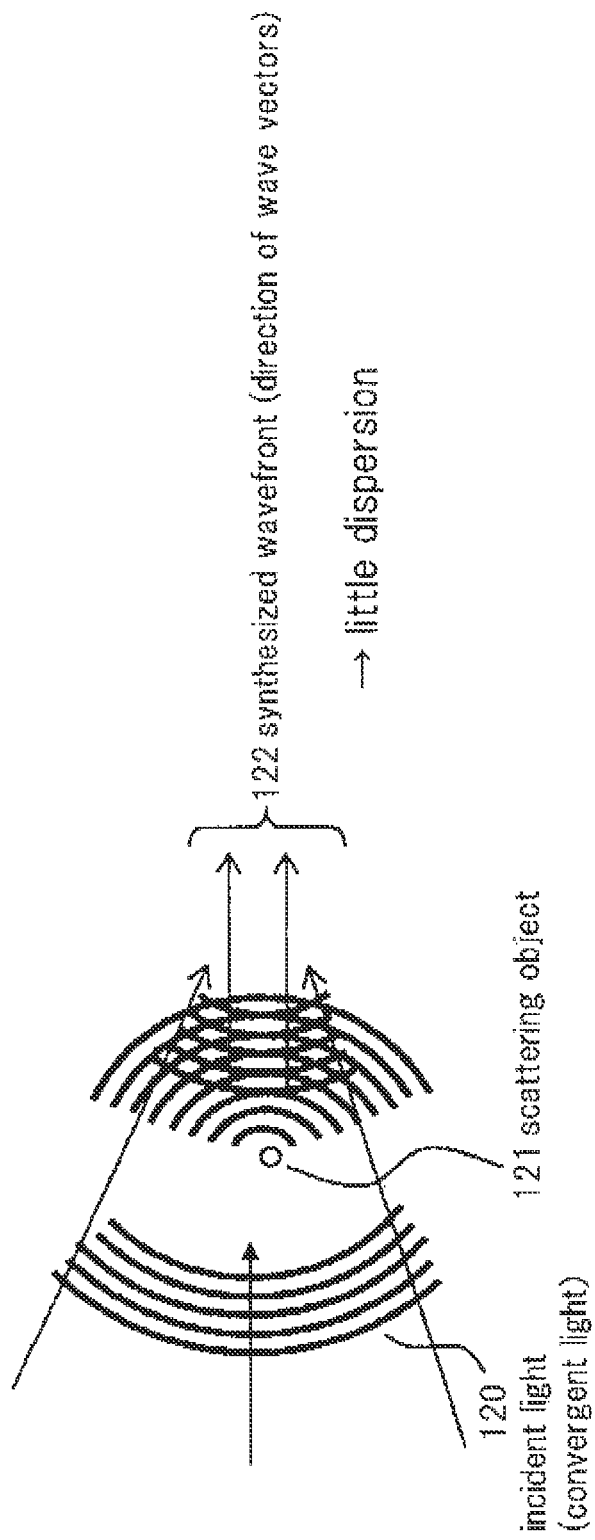

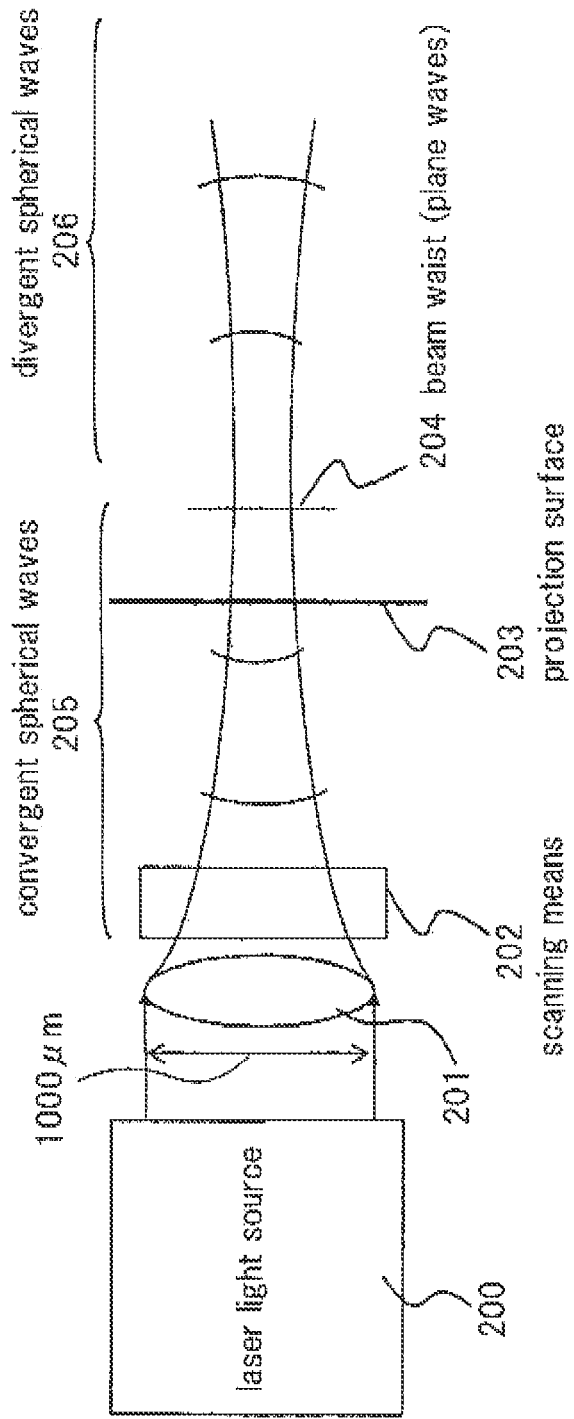

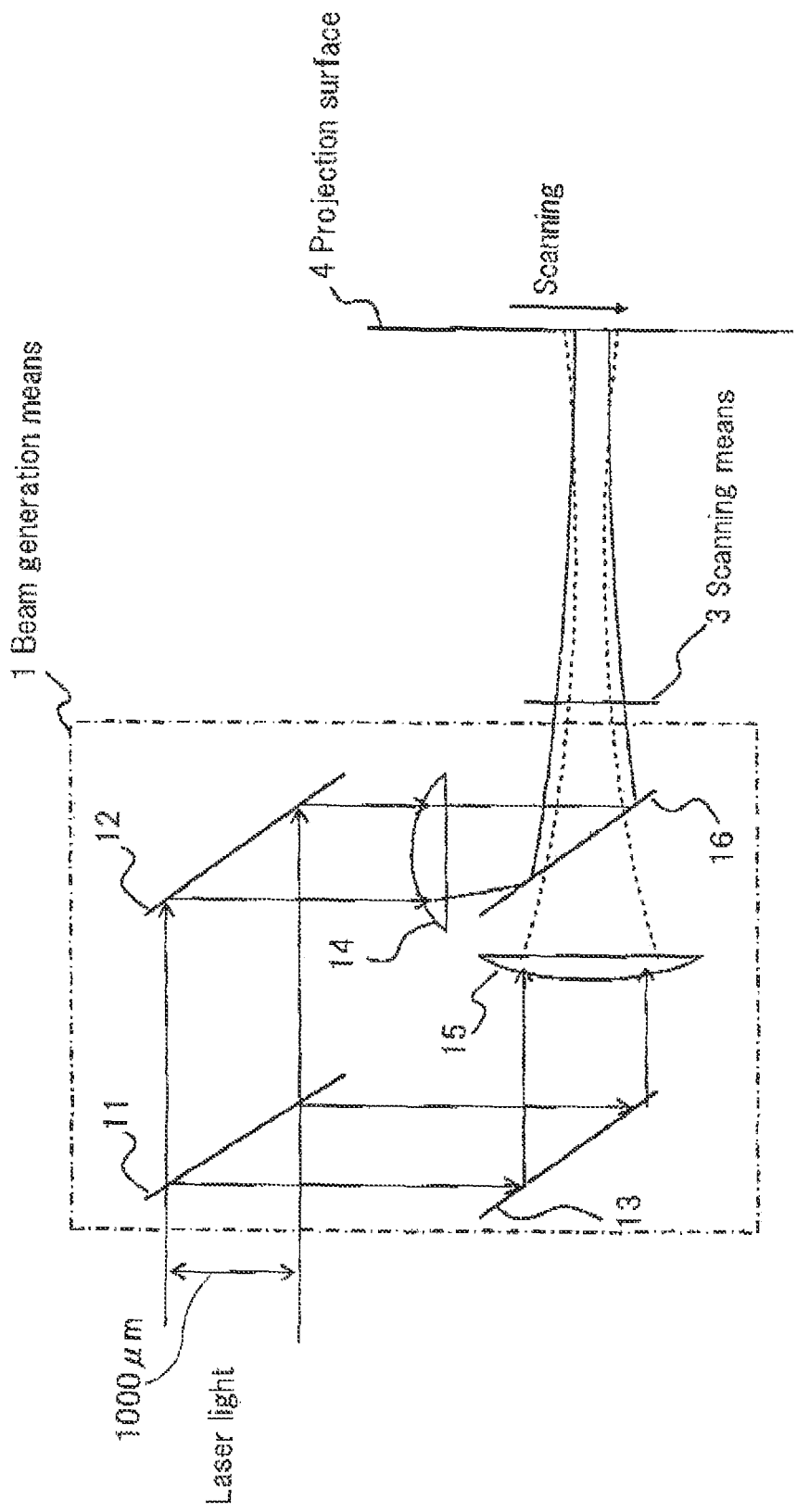

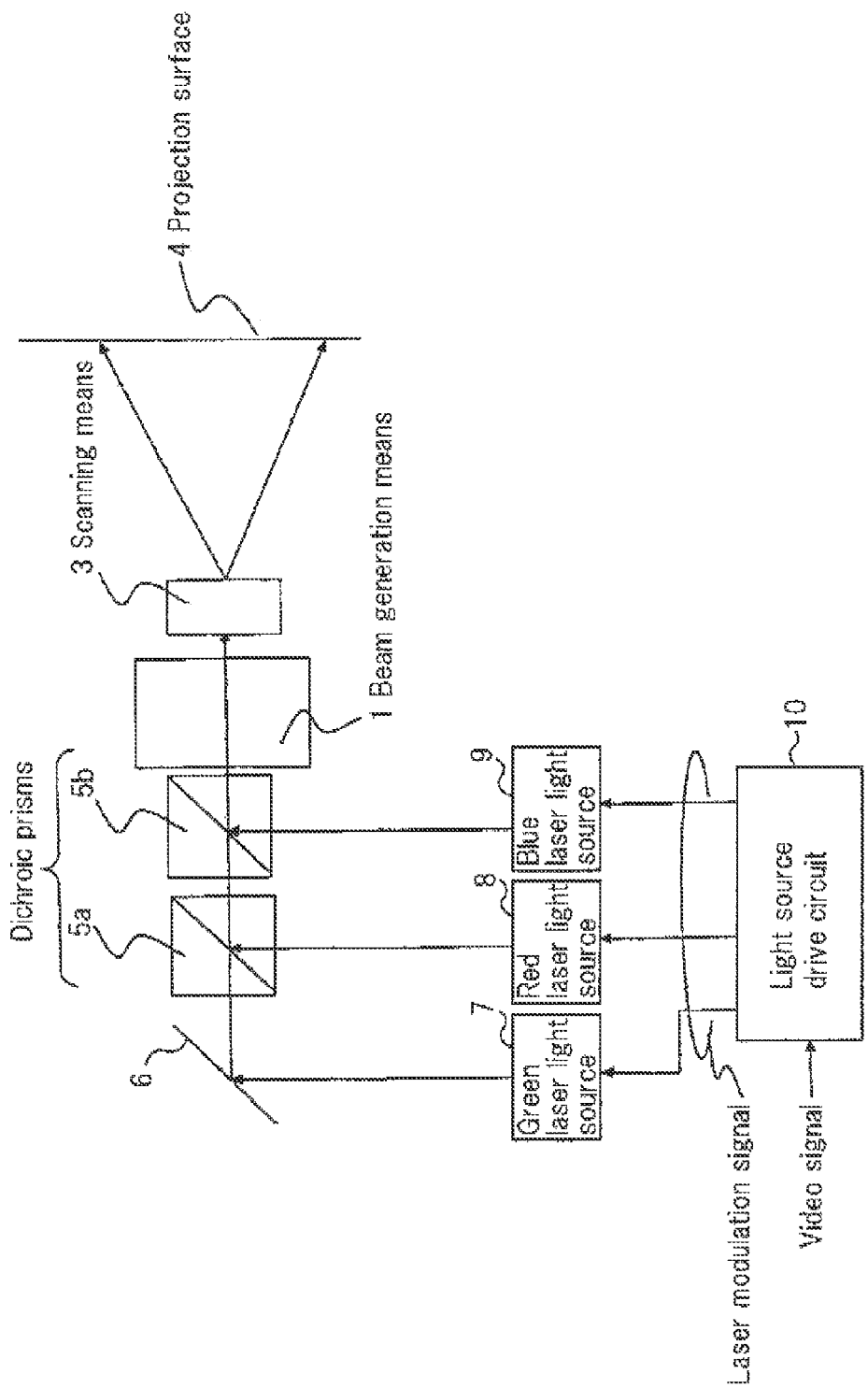

Fig.8
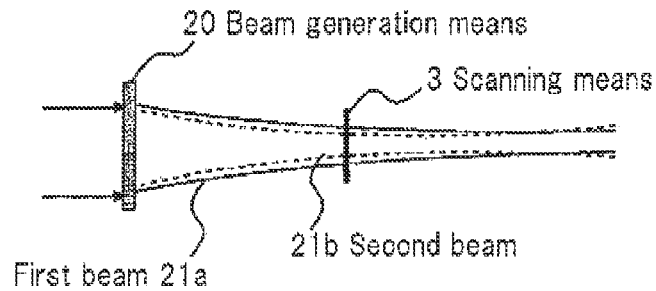
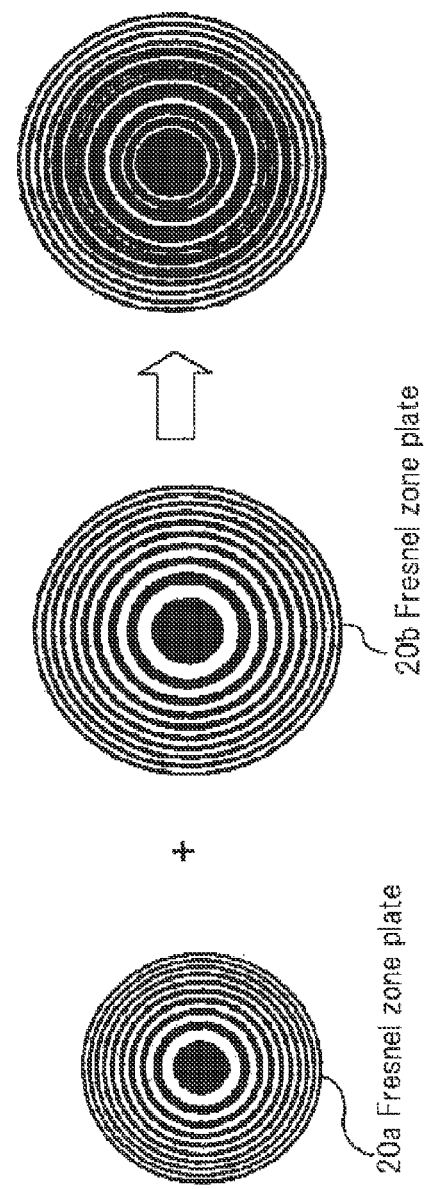
Fig.9

IMAGE PROJECTION DEVICE, IMAGE PROJECTION METHOD, AND IMAGE DISPLAY DEVICE

TECHNICAL FIELD

The present invention relates to image projection device that scans a projection surface by means of a light beam such as a Gaussian beam (for example, a laser beam) to display an image.

BACKGROUND ART

Patent Document 1 describes an image display device that displays an image by scanning the projection surface by a light beam that is modulated according to a video signal. This image display device includes condensing optics that condense the light beam from a light source and a scanning unit provided with a reflecting mirror that reflects the light beam that has been condensed by these condensing optics toward the projection surface.

The condensing optics form a beam waist at a position farther from the reflecting mirror than the midpoint between the reflecting mirror and the projection surface. In this way, the beam diameter on the reflecting mirror of the scanning unit can be reduced, and moreover, enlargement of the beam diameter on the projection surface can be suppressed, thereby enabling a more compact reflecting mirror and higher-definition image display.

LITERATURE OF THE PRIOR ART

Patent Documents

Patent Document 1: Japanese Unexamined Patent Application Publication No. 2007-121538

SUMMARY OF THE INVENTION

When the projection surface is scanned by a laser beam to display an image, noise occurs in the form of spots referred to as speckle that originate from the coherence of the laser beam. Speckle is a distraction when viewing a displayed image and detracts from image quality.

In the image display device described in Patent Document 1, a beam waist is formed between the reflecting mirror of the scanning unit and the projection surface at a position that is farther from the reflecting mirror than the midpoint. In this configuration as well, the above-described speckle also occurs, resulting in a decrease of image quality.

When the beam waist is arranged in the neighborhood of the center position, since the beam diameter on the projection surface becomes large, it is difficult to obtain highly precise images.

An object of the present invention is to provide an image projection device, an image projection method, and an image display device that can solve the foregoing problem and reduce speckles without sacrificing resolution of images.

To accomplish the foregoing object, an image projection device according to one aspect of the present invention comprises beam generation means that emits a plurality of beams in one direction such that the plurality of beams are superimposed on each other, a convergence angle of each beam being different from each other; and scanning means that scans a projection surface with the beams emitted from the beam, generation means.

An image projection method according to one aspect of the present invention comprises combining, to form a composite beam, a plurality of beams such that an energy density on a cross plane of the plurality of beams becomes the highest, a convergence angle of each beam being different from each other and the cross plane being perpendicular to an optical axis; and scanning a projection surface with the composite beam.

An image projection method according to another aspect of the present invention, comprises:
  splitting an incident beam into a plurality of beams;
  causing a plurality of lenses to condense the plurality of beams, a focal distance of each lens being different from each other;
  combining individual beams condensed by the plurality of lenses to form a composite beam and scanning a projection surface with the composite beam,
  wherein a plurality of shutters arranged on individual optical paths of the plurality of beams are successively released for every constant period.

An image projection method according to another aspect of the present invention, comprises:
  causing a spatial optical modulator that generates image light corresponding to an input drive signal to spatially modulate an incident beam; and
  scanning a projection surface with the beam obtained by the modulation,
  wherein a plurality of drive signals that cause image light corresponding to a plurality of Fresnel zone plates s are supplied to the spatial optical modulator for every constant period, a focal distance of each Fresnel zone plate being different from each other.

An image display device according to one aspect of the present invention comprises:
  a projection surface;
  light condensing means that condenses an incident beam; and
  scanning means that scans the projection surface with the beam that passes through the light condensing means,
  wherein the projection surface is arranged at a position closer to the scanning means than at a position where a beam waist of the beam that passes through the light condensing means is present and in a range defined by a Rayleigh length on a convergence side of the beam that passes through the light condensing means.

BRIEF DESCRIPTION OF DRAWINGS

FIG. 1A is a schematic diagram showing a state of a composite wavefront that takes place when a scattering substance is irradiated with collimated light.

FIG. 1B is a schematic diagram showing a state of a composite wavefront that takes place when a scattering substance is irradiated with diverged light.

FIG. 1C is a schematic diagram showing a state of a composite wavefront that takes place when a scattering substance is irradiated with convergent light.

FIG. 2A is a schematic diagram describing a state of a wavefront that takes place when a projection surface is scanned with a condensed beam.

FIG. 3 is a schematic diagram showing a structure of principal sections of an image projection device according to a first exemplary embodiment of the present invention.

FIG. 6 is a block diagram showing an overall structure of the image projection device according to the first exemplary embodiment of the present invention.

FIG. 8 is a schematic diagram showing a structure of principal sections of an image projection device according to a second exemplary embodiment of the present invention.

FIG. 9 is a schematic diagram describing a structure of beam generation means for use in the image projection device shown in FIG. 8.

DESCRIPTION OF REFERENCE NUMERALS

Figure 2B:
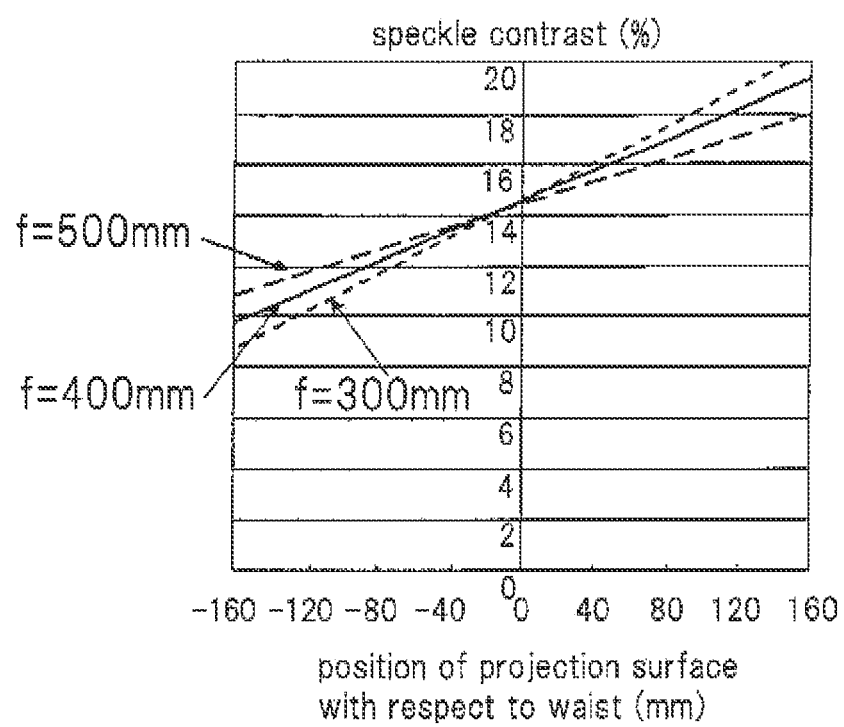
FIG. 2B is a characteristic diagram showing variations of a contrast of speckles that take place when a projection surface is moved fore and aft relative to a beam waist.

1 Beam generation means
3 Scanning means
4 Projection surface
11 Splitting means
12, 13 Reflection mirrors
14, 15 Lenses
16 Compositing means Best Modes That Carry Out The Invention The inventors of the present application analyzed causes of the occurrence of speckle and gained the new information described hereinbelow.

FIG. 1A is a schematic view showing the state of a synthesized wavefront that is produced when parallel light is irradiated upon a scattering object. When parallel light 100 reaches scattering object 101, secondary spherical waves are produced at scattering object 101. The directions of the wave vectors that are prescribed by the synthesized wavefront of these secondary spherical waves and the wavefront of parallel light 100 become divergent directions, and the dispersion of wave vectors becomes great. Speckle increases with increase in the dispersion of wave vectors.

FIG. 1B is a schematic view showing the state of the synthesized wavefront that is produced when divergent light is irradiated upon a scattering object. When divergent light 110 reaches scattering object 111, secondary spherical waves are produced at scattering object 111. The directions of wave vectors prescribed by the synthesized wavefront of these secondary spherical waves and the wavefront of divergent light 110 become directions that diverge (disperse) even more greatly than the case shown in FIG. 1A. The dispersion of wave vectors in this case is even greater than the case shown in FIG. 1A, and speckle is consequently even greater.

FIG. 1C is a schematic view showing the state of the synthesized wavefront that is produced when convergent light is irradiated upon a scattering object. When convergent light 120 reaches scattering object 121, secondary spherical waves are produced at scattering object 121. The wave vectors that are prescribed by the synthesized wavefront of these secondary spherical waves and the wavefront of convergent light 120 are substantially parallel. The dispersion of wave vectors in this case is less than the cases shown in FIG. 1A and FIG. 1B, and as a result, there is less speckle.

As can be seen from FIGS. 1A-1C, the projection surface (scattering object) is preferably scanned by convergent light.

However, in an optical scanning system in which laser light is condensed and the projection surface then scanned by the condensed beam, cases occur in which, depending on the distance from the system to the projection surface, the beam that is projected upon the projection surface does not become convergent light.

FIG. 2A is a schematic view of the wavefront when the projection surface is scanned by a condensed beam.

In the system shown in FIG. 2A, laser light from laser light source 200 is condensed by condenser lens 201. Scanning means 202 scans projection surface 203 by the beam from condenser lens 201. The beam emitted from condenser lens 201 is propagated as convergent spherical waves 205 and then changes in state from convergent spherical waves 205 to divergent spherical waves 206 with the position at which beam waist 204 forms as the boundary.

When projection surface 203 is located toward the side of condenser lens 201 from beam waist 204, projection surface 203 is scanned by a beam of convergent spherical waves 205. In this case, projection surface 203 is scanned by convergent light, whereby speckle can be reduced.

In contrast, when projection surface 203 is positioned farther from condenser lens 201 than beam waist 204, projection surface 203 is scanned by a beam of divergent spherical waves 206. In this case, projection surface 203 is scanned by divergent light, and speckle therefore becomes difficult to reduce.

FIG. 2B shows the change in speckle contrast (%) when a projection surface is moved back and forth with the position of the beam waist as the reference. Speckle contrast indicates the degree of speckle, and more specifically, is a value for a speckle image that is obtained by dividing the standard deviation value of the value of a picture element by the average value of each picture element. In FIG. 2B, the horizontal axis indicates the distance (mm) from the beam waist. The position of the beam waist is assumed to be "0" with the side of condenser lens 201 being indicated by minus and the opposite side being indicated by plus. In addition, the change of speckle contrast is shown by a broken line (short), a solid line, and a broken line (long) for cases in which the focal length of condenser lens 201 is 300 mm, 400 mm, and 500 mm, respectively.

As can be seen from FIG. 2B, when the projection surface is positioned on the side of the condenser lens from the position of the beam waist, the speckle contrast is reduced. In this case, the speckle contrast decreases with increasing proximity of the projection surface to the condenser lens. The speckle contrast decreases as the focal length decreases.

On the other hand, speckle contrast increases when the projection surface is positioned on the side farther from the condenser lens than the position of the beam waist. In this case, speckle contrast increases as the projection surface becomes increasingly remote from the position of the beam waist. Speckle contrast increases with decreasing focal length.

Accordingly, in an optical scanning system in which a projection surface is scanned by laser light (Gaussian beam), the projection surface must be positioned closer to the condenser lens than the position of the beam waist in order to decrease speckle contrast.

In addition, when the beam diameter on the projection surface is large, resolution decreases. Accordingly, a projection surface is preferably positioned in the vicinity of the beam waist in order to limit a decrease of resolution. More specifically, taking the beam waist as a reference, the projection surface is preferably positioned within a range prescribed by the Rayleigh length from the reference (a range of distances in which the beam diameter is a multiple of √2).

From the foregoing, to obtain a speckle reduction effect, a projection surface (screen) needs to be scanned with convergent light, and also to obtain highly precise images, beam diameters need to be suppressed from widening.

Next, as exemplary embodiments of the present invention, image projection devices (of front projection type) and image display devices (of real projection type) that allow a projection surface (screen) to be scanned with convergent light and that suppress beam diameters from widening will be described.

(First Exemplary Embodiment)

FIG. 3 is a schematic diagram showing a structure of principal sections of an image projection device according to a first exemplary embodiment of the present invention.

Referring to FIG. 3, the image projection device has beam generation means 1 that emits a plurality of beams having different convergence angles in one direction such that the plurality of beams are superimposed each other; and scanning means 3 that scans projection surface 4 with the beams emitted from beam generation means 1.

Beam generation means 1 has splitting means 11, reflection mirrors 12, 13, lenses 14, 15, and compositing means 16. Splitting means 11 splits incident laser light (a beam modulated corresponding to a video signal) into two beams. As splitting means 11, a beam splitter or a half mirror can be used.

Reflection mirror 12 is arranged in the traveling direction of a first beam (transmission light) that is transmitted through splitting means 11; and lens 14 is arranged in the traveling direction of the first beam reflected by reflection mirror 12.

Reflection mirror 13 is arranged in the traveling direction of a second beam (reflection light) reflected by splitting means 11; and lens 15 is arranged in the traveling direction of the second beam reflected by reflection mirror 13.

The focal distance of lens 14 is different from the focal distance of lens 15. According to this embodiment, the focal distance of lens 14 is 400 mm, whereas the focal distance of lens 15 is 300 mm. The focal distances of lenses 14 and 15 are not limited to these value, but other values.

Compositing means 16 is for example a beam splitter or a half mirror. Compositing means 16 is arranged at the position where the first beam that passes through lens 14 intersects with the second beam that passes through lens 15 and compositing means 16 reflects part of the first beam and transmits part of the second beam. The traveling direction of the first beam that passes through compositing means 16 coincides with the traveling direction of the second beam that passes through compositing means 16 and the axis that passes through the center of the cross section of the first beam coincides with the axis that passes through the center of the cross section of the second beam.

Scanning means 3 is arranged in the traveling directions of the first and second beams that pass through compositing means 16. Scanning means 3 is arranged at a position closer to compositing means 16 than at positions of their beam waists.

Figure 4:
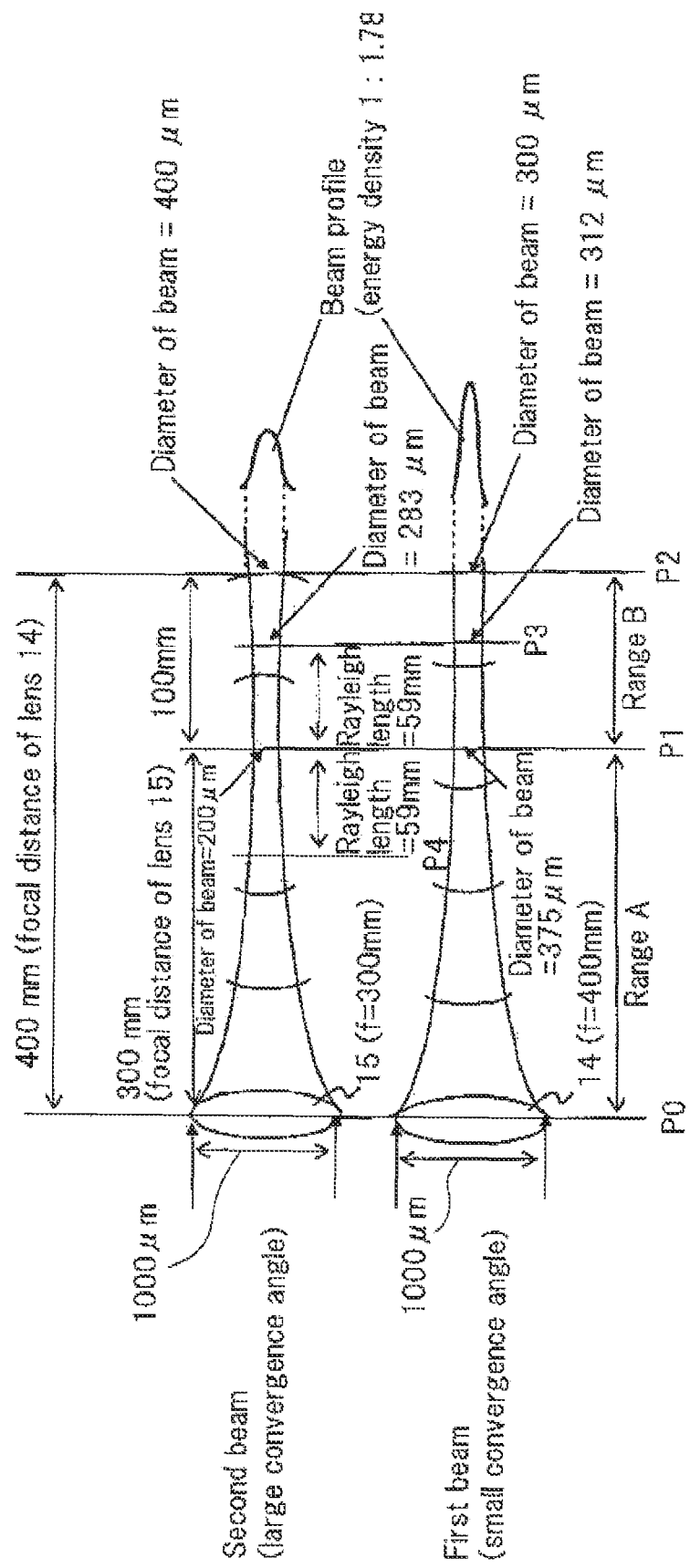
FIG. 4 is a schematic diagram showing states of wavefronts and energy densities of first and second beams of the image projection device shown in FIG. 3.

FIG. 4 schematically shows states of wavefronts and energy densities of the first and second beams from lenses 14, 15. For simplicity, FIG. 4 shows that the optical axes of lenses 14, 15 are in parallel with each other and lie on one surface and that the states of the first and second beams are viewed from a direction perpendicular to the surface.

In FIG. 4, the scanning means is omitted. The scanning means can be arranged anywhere between the beam generation means and the projection surface. For example, the scanning means can be arranged on the projection surface side at a position 10 mm apart from the beam generation means.

The convergence angle of the first beam is smaller than the convergence angle of the second beam. In FIG. 4, the states of wavefronts and energy densities of the first and second beams are based on position P0 represented by a straight line that connects the centers of lenses 14, 15. In range A from position P0 to position P1, which is a focal distance (300 min) of lens 15 (where a beam waist of the second beam is present), the first and second beams are convergent light (convergent spherical wave beams). In range B from position P1 to position P2, which is a focal distance (400 mm) of lens 14 (where a beam waist of the second beam is present), the second beam is diverged light (diverged spherical wave beam) and the first beam is convergent light (convergent spherical wave beam).

At position P1, the diameter of the first beam is 375 µm, whereas the diameter of the second beam is 200 µm. At position P2, the diameter of the first beam is 300 µm, whereas the diameter of the second beam is 400 µm. At position P2, the energy density of the first beam is around 1.78 times the energy density of the second beam. The beam diameter is defined as the diameter of the beam at a position where the intensity becomes the square of 1/e (where e is the base of the natural logarithms).

The Rayleigh length of the second beam (that is a distance where the diameter of the beam increases √2 times) is 59 mm. At position P3 that is apart from position P1 by the Rayleigh length (59 mm) in the direction of position P2, the diameter of the first beam is 312 µm, whereas the diameter of the second beam is 283 µm.

Figure 5:
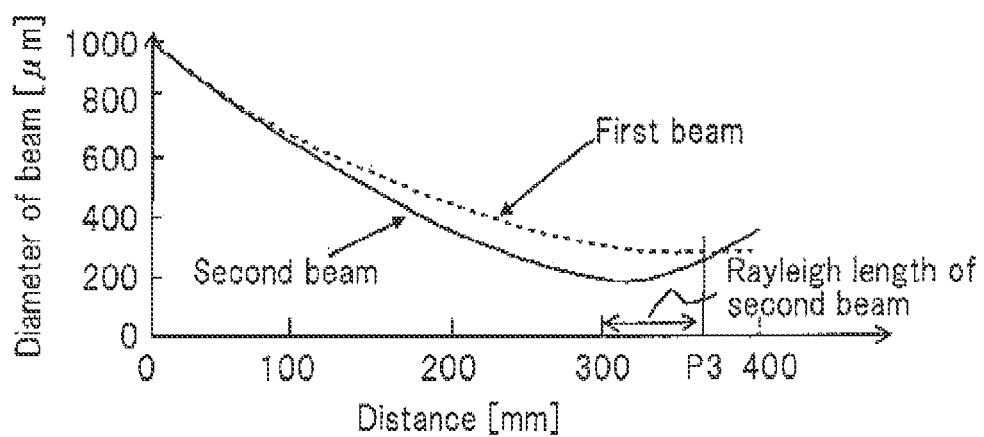
FIG. 5 is a characteristic diagram showing variations of diameters of the first and second beams of the image projection device shown in FIG. 3.

FIG. 5 shows variations of the diameters of the first and second beams as shown in FIG. 4. In FIG. 5, the vertical axis represents the diameters of beams (µm), whereas the horizontal axis represents the distances from position P0 shown in FIG. 4. As shown in FIG. 5, in the range from position P0 nearly to position P3, the diameter of the first beam is greater than the diameter of the second beam. When the distance nearly exceeds position P3, the diameter of the first beam becomes smaller than the diameter of the second beam. The diameters of beams are defined as their energy densities.

According to this embodiment, at the position defined by the Rayleigh length on the diverged spherical wave side of the second beam having a large convergence angle (position P3 shown in FIG. 4), the diameter of the first beam having a small convergence angel coincides with or nearly coincides with the diameter of the second beam. Thus, the range in which speckles can be reduced without sacrificing resolution of images can be widened. Next, this reason will be specifically described.

In the example shown in FIG. 4, the position defined by the Rayleigh length on the convergent spherical wave side of the second beam having a large convergence angel is denoted by P4. In the range from position P0 to position P4, since both the first and second beams are convergent light, when the image projection device is arranged such that the projection surface lies in this range, the contrast of speckles can be reduced.

In this case, however, the diameter of the first beam is in excess of the value of $\sqrt{2}$ times the diameter of the beam (300 μm) at position P2 where a beam waist is present and the diameter of the second beams is in excess of the value of $\sqrt{2}$ times the diameter of the beam (200 μm) at position P1 where a beam waist is present. Thus, the diameter of the beam on the projection surface becomes large and thereby the resolution of an image that appears decreases.

In the range from position P4 to position P1, since both the first and second beams are convergent light, when the image projection device is arranged such that the projection surface lies in this range, the contrast of speckles can be decreased.

In the foregoing case, although the diameter of the first beam is in excess of the value of $\sqrt{2}$ times the diameter of the beam (300 μm) at position P2 where a beam waist is present in part of the range, the diameter of the second beam is equal to or smaller than the value of $\sqrt{2}$ times the diameter of the beam (200 μm) at position P1 where a beam waist is present in all the range. Since the resolution of an image that appears mainly depends on the second beam that has a high energy density, even if the diameter of the first beam is in excess of the value of $\sqrt{2}$ times the diameter of the beam (300 μm) at position P2, high resolutions of images can be maintained.

In the range from position P1 to position P3, although the first beam is convergent light, the second beam is diverged light. As shown in FIG. 2B, the intensity of the contrast of speckles linearly varies with the distance from the position where a beam waist is present. Thus, even if a beam is a diverged spherical wave, the contrast of speckles does not largely increase as long as the beam lies in the neighborhood of the position where a beam waist is present (specifically, in the range of the Rayleigh length).

In addition, at position P3, the diameter of the first beam nearly coincides with the diameter of the second beam. When these conditions are satisfied, in the range from position P1 to position P3, the energy density of the first beam can be nearly the same as the energy density of the second beam.

Thus, since the increase of the contrast of speckles caused by the second beam (diverged light) is small and since the difference between the energy density of the first beam and the energy density of the second beam is small, the speckle contrast reduction effect of the first beam (convergent light) can be sufficiently obtained in a composite beam of the first and second beams.

In the range from position P3 to position P2, although the first beam is convergent light, the second beam is diverged light. In this range, since the energy density of the first beam is equal to or greater than the energy density of the second beam, the speckle contrast reduction effect of the first beam (convergent light) can be sufficiently obtained.

Since the energy density of the first beam (convergent light) is nearly equal to or greater than the energy density of the second beam at position P3, high resolutions of images can be maintained, As described above, the image projection device according to this embodiment can decrease the contrast of speckles without sacrificing the high resolutions of images when the projection surface lies in the range from position P4 to position P2 shown in FIG. 4.

In addition, according to this embodiment, the range in which a projection surface can be scanned with convergent light is from position P4 to position P2 and is sufficiently greater than the range in which projection surface 203 can be arranged in the system shown in FIG. 2A. Thus, since the range in which the projection surface can be arranged widens, a bothersome installation work for the image projection device can be alleviated.

In the structure shown in FIG. 3, although beam generation means 1 is structured such that it emits two beams having different convergence angles, beam generation means 1 may be structured such that it emits three or more beams having different convergence angles. Beams are emitted such that axes that pass through the center of the cross section of each beam coincide with each other.

However, the energy density of each beam needs to satisfy the following conditions. With respect to the first beam and the second beam, the second beam has a next larger convergence angle than that of the first beam in which the energy density of the first beam, at the position where a beam waist of the first beam is present, coincides with the energy density of the second beam at a position in the range from the position where a beam waist of the second beam is present to the position of the Rayleigh length on the divergent side (specifically, in the range from position P1 to position P3 shown in FIG. 4). In this case, the range in which the projection surface can be arranged can be further widened compared to the structure of two beams. Whatever are the energy densities that coincide with each other, this means that not only the values fully coincide with each other, but also that the values containing deviations caused by production errors or the like nearly coincide with each other.

Next, the overall structure of the image projection device according to this embodiment will be described.

FIG. 6 is a block diagram showing the overall structure of the image projection device according to this embodiment. Referring to FIG. 6, the image projection device has beam generation means 1, scanning means 3, dichroic prisms 5a, 5b, reflection mirror 6, green laser light source 7, red laser light source 8, blue laser light source 9, and light source drive circuit 10. Beam generation means 1 and scanning means 3 shown in FIG. 6 are the same as those shown in FIG. 3.

Light source drive circuit 10 generates a green laser modulation signal, a red laser modulation signal, and a blue laser modulation signal corresponding to an input video signal. The green laser modulation signal is supplied to green laser light source 7. The red laser modulation signal is supplied to red laser light source 8. The blue laser modulation signal is supplied to blue laser light source 9.

Figure 7A:
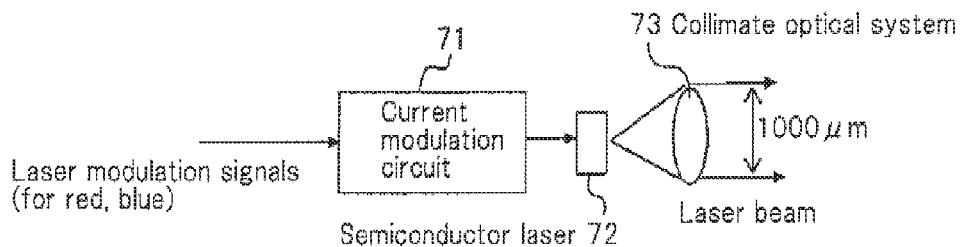
FIG. 7A is a block diagram showing a structure of a red laser light source and a blue laser light source for use in the image projection device shown in FIG. 6.

FIG. 7A shows the structure of a laser light source used as red laser light source 8 and blue laser light source 9.

The laser light source shown in FIG. 7A includes current modulation circuit 71, semiconductor laser 72, and collimate optical system 73. Current modulation circuit 71 controls a current that flows in semiconductor laser 72 corresponding to the laser modulation signal (for red or blue) supplied from light source drive circuit 10. As a result, the intensity of output light of semiconductor laser 72 is modulated. Laser light emitted from semiconductor laser 72 is collimated by collimate optical system 73.

Red laser light source 8 uses a semiconductor laser having an oscillation wavelength of 640 nm as semiconductor laser 72. Blue laser light source 9 uses a semiconductor laser having an oscillation wavelength of 440 nm as semiconductor laser 72.

Figure 7B:
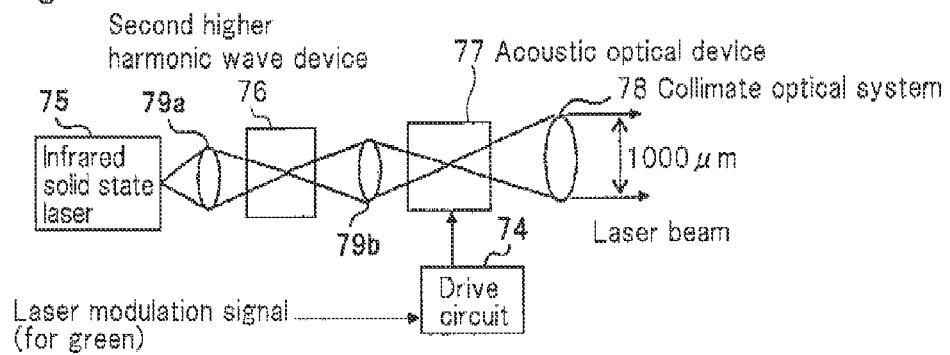
FIG. 7B is a block diagram showing a structure of a green laser light source for use in the image projection device shown in FIG. 6.

FIG. 7B shows the structure of green laser light source 7. The laser light source shown in FIG. 7B includes drive circuit 74, infrared solid state laser 75, second higher harmonic wave device 76, acoustic optical device 77, collimate optical system 78, and convergence optical systems 79a, 97b.

Second higher harmonic wave device 76 outputs a second higher harmonic wave (532 nm) of an infrared laser light (1064 nm) that is emitted from infrared solid state laser 75 through convergence optical system 79a. A second higher harmonic wave beam that passes through second higher harmonic wave device 76 enters acoustic optical device 77 through convergence optical system 79b. Drive circuit 74 drives acoustic optical device 77 corresponding to a laser modulation signal (for green) that is supplied from light source drive circuit 10. As a result, the intensity of the beam of the second higher harmonic wave that is supplied from second higher harmonic wave device 76 is modulated. A beam that passes through acoustic optical device 77 is collimated by collimate optical system 78.

Figure 7C:
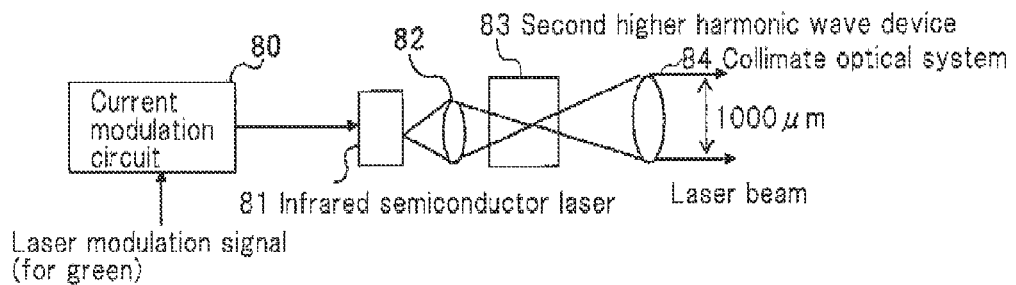
FIG. 7C is a block diagram showing another structure of the green laser light source for use in the image projection device shown in FIG. 6.

FIG. 7C shows another structure of green laser light source 7. The laser light source shown in FIG. 7C includes current modulation circuit 80, infrared semiconductor laser 81, convergence optical system 82, second higher harmonic wave device 83, and collimate optical system 84.

Current modulation circuit 80 modulates a current supplied to infrared semiconductor laser 81 corresponding to a laser modulation signal (for green) that is supplied from light source drive circuit 10. Infrared laser light that is emitted from infrared semiconductor laser 81 enters second higher harmonic wave device 83 through convergence optical system 82.

Second higher harmonic wave device 83 outputs a second higher harmonic wave of the infrared laser light that passes through convergence optical system 82. A beam of the second higher harmonic wave that passes through second higher harmonic wave device 83 is collimated by collimate optical system 84.

Referring to FIG. 6 again, reflection mirror 6 is arranged in the traveling direction of laser light (for green) emitted from green laser light source 7. Dichroic prisms 5a, 5b, beam generation means 1, and scanning means 3 are successively arranged in the traveling direction of the laser light (for green) reflected by reflection mirror 6.

Dichroic prism 5a is arranged at the position where laser light (for green) emitted from green laser light source 7 intersects with laser light (for red) emitted from red laser light source 8. Dichroic prism 5a transmits laser light (for green) emitted from green laser light source 7 and reflects laser light (for red) emitted from red laser light source 8. As a result, laser light (for green) and laser light (for red) are combined.

Dichroic prism 5b is arranged at the position where the color composite beam (green+red) that passes through dichroic prism 5a intersects with laser light (for blue) emitted from blue laser light source 9. Dichroic prism 5b transmits the combined-color beam (green+red) that passes through dichroic prism 5a and reflects laser light (for blue) emitted from blue laser light source 9. As a result, the beam (green+red) and the laser light (blue) are combined.

The combined-color beam (green+red+blue) that passes through dichroic prism 5b is supplied to beam generation means 1. Beam generation means 1 splits the color composite beam that passes through dichroic prism 5b into a plurality of beams having different convergence angles and emits the split beams in one direction such that the split beams are superimposed each other. The beam emitted from beam generation means 1 enters scanning means 3.

Figure 7D:
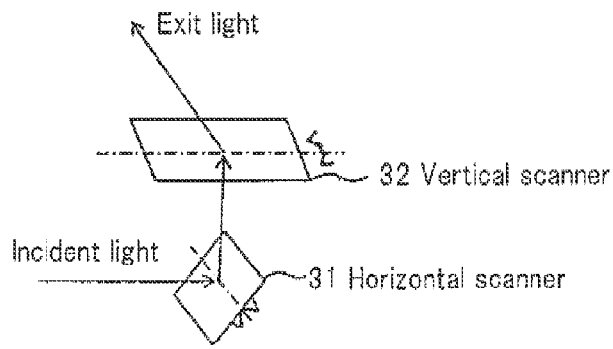
FIG. 7D is a block diagram showing a structure of scanning means for use in the image projection device shown in FIG. 6.

FIG. 7D shows a structure of scanning means 3. As shown in FIG. 7D, scanning means 3 includes horizontal scanner 31 and vertical scanner 32.

Horizontal scanner 31 is composed of, for example, a resonance micro-mechanical scanning element. The resonance micro-mechanical scanning element is an element capable of reciprocating scanning. The deflection angle is ±20 degrees, and the drive frequency is 15 KHz. In order to enable driving at a drive frequency of 15 KHz in this case, a rectangular mirror having a diameter of 1400 µm is used as the resonant micro-mechanical scanning element.

Vertical scanner 32 is composed of a galvanometer mirror. A galvanometer mirror has a deflection angle of, for example, ±15 degrees and is driven by a sawtooth wave of 60 Hz.

In the image projection device according to this embodiment shown in FIG. 3 to FIG. 6 and FIG. 7A to FIG. 7D, in the condition that projection surface 4 was arranged at the position of the focal distance of lens 14 (at the position of 400 mm from P0), when only the second beam was projected to projection surface 4, the contrast of speckles was 19.1%; in the same condition for projection surface 4, when the first and second beams were projected thereto, the contrast of speckles was 16.4%; and in the same condition for projection surface 4, when only the first beam was projected thereto, the contrast of speckles was 16.8%. Thus, these experimental results show that when projection surface 4 is scanned with the first and second beams having different convergence angles, speckles can be decreased.

When a high frequency current of 300 MHz is superimposed with individual modulation currents of red laser light source 8 and blue laser light source 9, the wavelengths of these light sources can be widened. As a result, the contrast of speckles caused by red laser light and blue laser light can be reduced by 12.0%.

In the foregoing evaluation for the contrast of speckles, a CMOS sensor provided with a lens having a focal distance of 18 mm and a pupil diameter of 2.25 mm was used. The pixel pitch of the CMOS sensor was 2.2 µm. The horizontal and vertical image precisions were 640 pixels and 480 pixels, respectively. The horizontal and vertical screen sizes at a projection distance of 400 mm were 290 cm and 220 cm, respectively.

(Second Exemplary Embodiment)

FIG. 8 is a schematic diagram showing the structure of principal sections of an image projection device according to a second exemplary embodiment of the present invention.

Referring to FIG. 8, the image projection device has beam generation means 20 that emits a plurality of beams having different convergence angles in one direction such that the plurality of beams are superimposed each other; and scanning means 3 that scans a projection surface with the beams emitted from beam generation means 20.

Scanning means 3 used in this embodiment is the same as that used in the first embodiment. Beam generation means 20 is a multi-focal lens using Fresnel zone plates (diffraction gratings each having a lens function). FIG. 9 schematically shows Fresnel zone plates that compose beam generation means 20.

As shown in FIG. 9, beam generation means 20 is provided with two Fresnel zone plates 20a, 20b having different focal distances, Fresnel zone plates 20a, 20b each are composed of a plurality of concentric circular rings in which transparent rings and opaque rings are alternately arranged. Fresnel zone plates 20a, 20b may be phase-type Fresnel zone plates in which the phase difference of each of the transparent rings and opaque rings is 0 and ρ, respectively. Alternatively, Fresnel zone plates 20a, 20b may be transmissive-type Fresnel zone plates in which the transmittance of a transparent ring and the transmittance of an opaque ring are 100% and 0%, respectively, Further alternatively, instead of opaque rings, concentric translucent rings may be used.

By arranging these Fresnel zone plates 20a, 20b such that the center positions of the rings coincide with each other, a multi-focal lens is formed. The multi-focal lens may be composed in such manner that transparent rings and opaque rings of Fresnel zone plates 20a, 20b are formed together on a single glass plate. Alternatively, the multi-focal lens may be a spatial optical modulator (for example, a liquid crystal panel) that forms an image including transparent rings and opaque rings of Fresnel zone plates 20a, 20b. Such multi-focal lenses form beam generation means 20.

In beam generation means 20, Fresnel zone plates 20a and 20b generate first beam 21a and second beam 21b, respectively. The convergence angle of first beam 21a is smaller than the convergence angle of second beam 21b.

Scanning means 3 scans the projection surface with the first and second beams that are emitted from beam generation means 20.

As in the image projection device according to the first exemplary embodiment, in the image projection device according to the second exemplary embodiment, the diameter (or energy density) of first beam 21 a having a smaller convergence angle coincides with or nearly coincides with the diameter of the second beam (or energy density) at the position defined by the Rayleigh length on the diverged spherical wave side of second beam 21b having a large convergence angle (the position is equivalent to position P3 shown in FIG. 4). As a result, the range in which the speckles are reduced without sacrificing resolution of images can be more widened.

In addition, since the range in which the projection surface that is scanned with convergent light can be arranged widens, bothersome installation work for the image projection device can be prevented.

Although FIG. 8 shows the structure in which beam generation means 20 emits two beams having different convergence angles, beam generation means 20 may emit three or more beams having different convergence angles. In this case, with respect to the first beam and the second beam, the second beam has a next larger convergence angle than that of the first beam in which the energy density of the first beam, at the position where a beam waist of the first beam is present, coincides with the energy density of the second beam at a position in the range from the position where a beam waist of the second beam is present to the position of the Rayleigh length on the divergent side. With three or more beams, the range in which the projection surface can be arranged can be further widened. Whatever are the energy densities that coincide with each other, this means that not only the values fully coincide with each other, but also that the values containing deviations caused by production errors or the like nearly coincide with each other.

The overall structure of the image projection device according to this embodiment is the same as that of the image projection device according to the first exemplary embodiment (refer to FIG. 6 and FIG. 7A to FIG. 7D).

(Third Exemplary Embodiment)

Figure 10:
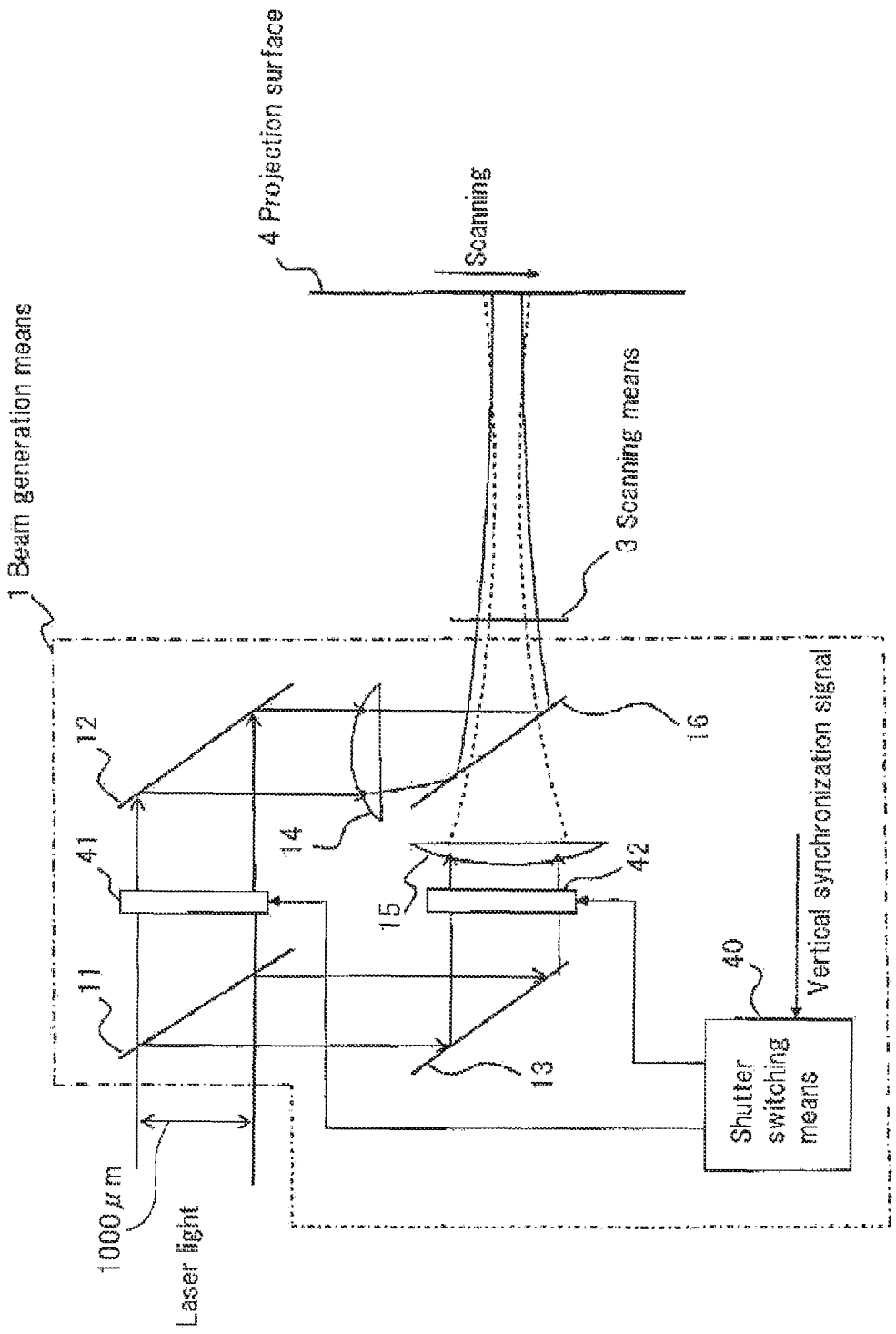
FIG. 10 is a schematic diagram showing a structure of principal sections of an image projection device according to a third exemplary embodiment of the present invention.

FIG. 10 is a schematic diagram showing the structure of principal sections of an image projection device according to a third exemplary embodiment of the present invention.

Referring to FIG. 10, although the image projection device includes beam generation means 1 and scanning means 3 shown in FIG. 1, part of beam generation means 1 is different from that of the first exemplary embodiment. Beam generation means 1 has shutter switching means 40 and shutters 41, 42 in addition to the structure shown in FIG. 1.

Shutters 41, 42 each are composed of a liquid crystal shutter, a chopper, or the like. Shutter 41 is arranged between splitting means 11 and reflection mirror 12. Shutter 42 is arranged between reflection mirror 13 and lens 15.

Shutter switching means 40 alternately switches states between a first state in which shutter 41 is released and shutter 42 is closed and a second state in which shutter 41 is closed and shutter 42 is released corresponding to a vertical synchronization signal. For example, when a vertical synchronization signal for a video signal at a frame frequency of 60 Hz is supplied to shutter switching means 40, shutter switching means 40 alternately switches the states between the first state and the second state every 1/60 seconds.

When shutters 41, 42 lie in the first state, a beam that travels from reflection mirror 13 to lens 15 is blocked by shutter 42, whereas only the first beam condensed by lens 14 reaches scanning means 3. Scanning means 3 scans projection surface 4 with the first beam that passes through lens 14.

When shutters 41, 42 lie in the second state, a beam that travels from splitting means 11 to reflection mirror 12 is blocked by shutter 41, whereas only the second beam condensed by lens 15 reaches scanning means 3. Scanning means 3 scans projection surface 4 with the second beam that passes through lens 15.

In this embodiment, the first beam that passes through lens 14 and the second beam that passes through lens 15 have the relationship as shown in FIG. 4, based on the condition in which projection surface 4 is arranged in the range from position P1 to position P2, when shutters 41, 42 are switched between the first and second states, the first beam that passes through lens 14 (convergent spherical wave) and the second beam that passes through lens 15 (diverged spherical wave) are alternately projected to projection surface 4 on a time division basis. In this case, the intensity of the beam of the convergent spherical wave and the intensity of the beam of the diverged spherical wave are added on projection surface 4. This is equivalent to the addition of incoherent beams and thereby a larger speckle reduction effect can be obtained than can be done in the first and second embodiments.

For example, based on the condition in which projection surface 4 lies at position P2 shown in FIG. 4, when projection surface 4 was scanned with the second beam that passed through lens 15, the contrast of speckles was 19.1%. In contrast, based on the same condition for projection surface 4, when the first beam that passed through lens 14 and the second beam that passed through lens 15 were alternately switched on a time division basis and projection surface 4 was scanned with these beams, the contrast of speckles was 14.8%.

As in the image projection device according to the first exemplary embodiment, in the image projection device according to the third exemplary embodiment, since the range in which the projection surface can be arranged can be widened in the range from position P4 to position P2 shown in FIG. 4, installation work for the image projection device can be easily performed.

With respect to the range from position P1 to position P2, when the first beam that passes through lens 14 (convergent spherical wave) and the second beam that passes through lens 15 (diverged spherical wave) are alternately switched on a time division basis, more speckles can be reduced than can be done in the first exemplary embodiment.

Figure 11:
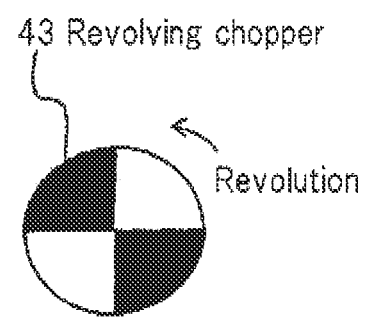
FIG. 11 is a schematic diagram describing a revolving chopper used as a shutter for use in the image projection device shown in FIG. 10.

As choppers for use in shutters 41, 42, revolving choppers may be used. FIG. 11 shows an example of a revolving chopper.

Revolving chopper 43 shown in FIG. 11 is formed in a disc shape and has first to fourth regions circumferentially split for every 90 degrees. The first and third regions are non-transparent regions. In contrast, the second and fourth regions are transparent regions. The transparent regions and the non-transparent regions are alternately arranged.

A center portion of revolving chopper 43 is supported by a rotating axis of a motor (not shown). The number of revolutions of the motor is synchronized with a video signal by a PLL (Phase-Locked Loop) circuit or the like. While a beam that passes through splitting means 11 is blocked by a non-transparent region of the revolving chopper that comprises shutter 41, a beam that is reflected by reflection mirror 13 passes through a transparent region of the revolving chopper that comprises shutter 42. By contrast, while a beam that is reflected by reflection mirror 13 is blocked by a non-transparent region of the revolving chopper that comprises shutter 42, a beam that passes through splitting means 11 passes through a transparent region of the revolving chopper that comprises shutter 41. As a result, the first beam that passes through lens 14 and the second beam that passes through lens 15 can be alternately switched on a time division basis.

Next, the overall structure of the image projection device according to this embodiment will be described.

Figure 12:
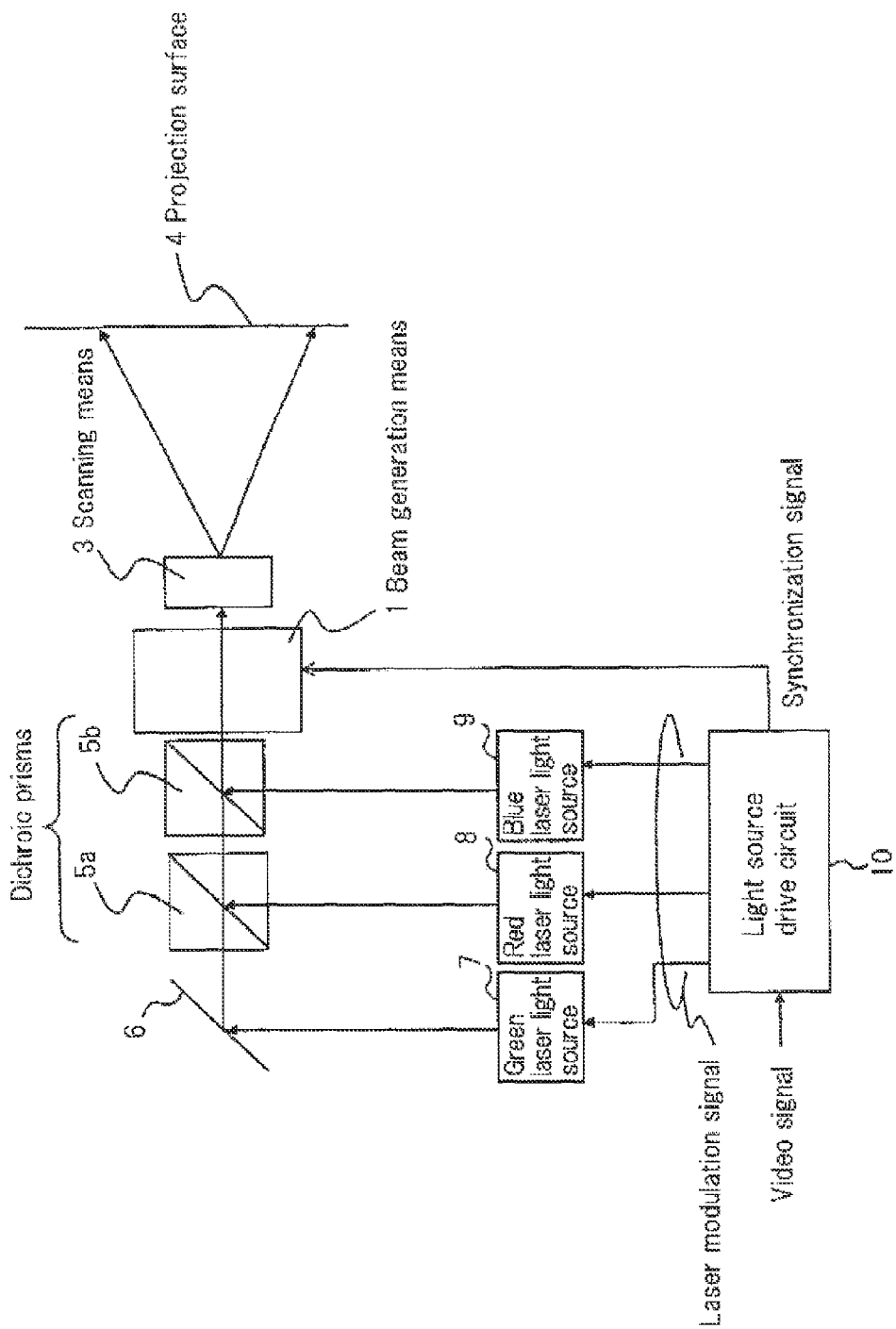
FIG. 12 is a block diagram showing an overall structure of the image projection device according to the third exemplary embodiment of the present invention.

FIG. 12 is a block diagram showing the overall structure of the image projection device according to this embodiment. Referring to FIG. 12, the image projection device includes beam generation means 1, scanning means 3, dichroic prisms 5a, 5b, reflection mirror 6, green laser light source 7, red laser light source 8, blue laser light source 9, and light source drive circuit 10. The structure except for beam generation means 1 and light source drive circuit 10 is the same as that shown in FIG. 6.

Light source drive circuit 10 supplies a laser modulation signal to each of green laser light source 7, red laser light source 8, and blue laser light source 9 corresponding to a video signal and also supplies a synchronization signal that synchronizes with the video signal to beam generation means 1.

Beam generation means 1 is the same as that shown in FIG. 10. In beam generation means 1, shutter switching means 40 controls shutters 41, 42 corresponding to the synchronization signal supplied from light source drive circuit 10.

(Fourth Exemplary Embodiment)

Figure 13:
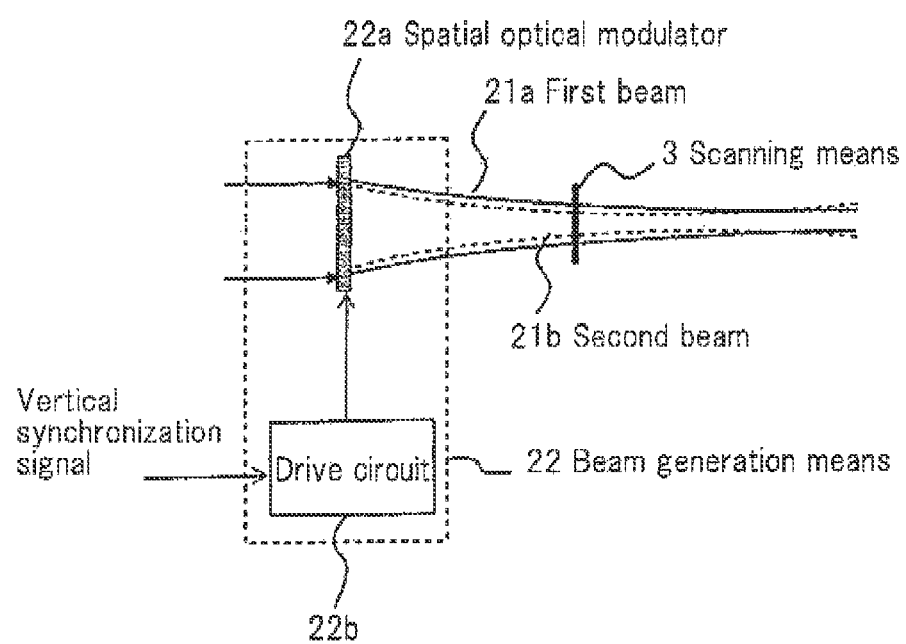
FIG. 13 is a schematic diagram showing a structure of principal sections of an image projection device according to a fourth exemplary embodiment of the present invention.

FIG. 13 is a schematic diagram showing the structure of principal sections of an image projection device according to a fourth exemplary embodiment of the present invention.

Referring to FIG. 13, the image projection device has beam generation means 22 that emits a plurality of beams having different convergence angles in one direction such that the plurality of beams are superimposed each other; and scanning means 3 that scans projection surface 4 with the beams emitted from beam generation means 22.

Scanning means 3 is the same as that of the first exemplary embodiment. Beam generation means 22 has spatial optical modulator 22a such as a liquid crystal panel; and drive circuit 22b that drives spatial optical modulator 22a.

Drive circuit 22b alternately outputs a first drive signal that causes a first image corresponding to Fresnel zone plate 20a shown in FIG. 9 to be formed and a second drive signal that causes a second image corresponding to Fresnel zone plate 20b shown in FIG. 9 to be formed. The first and second drive signals are supplied to spatial optical modulator 22a.

Spatial optical modulator 22a is a multi-focal lens and forms the first image and second image corresponding to Fresnel zone plates 20a and 20b based on the first and second drive signals supplied from drive circuit 22b, respectively.

According to this embodiment, the first and second drive signals are alternately supplied from drive circuit 22b to spatial optical modulator 22a for every frame identified by the vertical synchronization signal.

When the first drive signal is supplied to spatial optical modulator 22a, spatial optical modulator 22a forms the first image. As a result, first beam 21a condensed by Fresnel zone plate 20a is supplied to scanning means 3. Scanning means 3 scans the projection surface with first beam 21a.

When the second drive signal is supplied to spatial optical modulator 22a, spatial optical modulator 22a forms the second image. As a result, second beam 21b condensed by Fresnel zone plate 20b is supplied to scanning means 3. Scanning means 3 scans the projection surface with second beam 21b.

According to this embodiment, the first and second beams have the relationship as shown in FIG. 4. When projection surface 4 is arranged in the range from position P1 to position P2, the first beam (convergent spherical wave) and the second beam (diverged spherical wave) are alternately projected to projection surface 4 on time division basis. Thus, as in the image projection device according to the third exemplary embodiment, in the image projection device according to the fourth exemplary embodiment, the intensity of the convergent spherical wave and the intensity of the diverged spherical wave are added on projection surface 4 and thereby a larger speckle reduction effect can be obtained than can be realized in the first exemplary embodiment and the second exemplary embodiment.

In addition, as in the image projection device according to the first exemplary embodiment, in the image projection device according to the fourth exemplary embodiment, the range in which the projection surface can be arranged can be widened in the range from position P4 and position P2 (or from position P1 to position P2) shown in FIG. 4, therefore, installation work for the image projection device can be easily performed.

The overall structure of the image projection device according to this embodiment is the same as the overall structure shown in FIG. 12 except that beam generation means 1 is substituted with beam generation means 22.

Although beam generation means 22 is structured to emit two beams having different convergence angles, beam generation means 22 may be structured to emit three or more beams having different convergence angles. In this case, with respect to the first beam and the second beam, the second beam has a next larger convergence angle than that of the first beam in which the energy density of the first beam, at the position where a beam waist of the first beam is present, coincides with the energy density of the second beam at a position in the range from the position where a beam waist of the second beam is present to the position of the Rayleigh length on the divergent side. With three or more beams, the range in which the projection surface can be arranged can be further widened. Whatever are energy densities that coincide with each other, this means that not only the values fully coincide with each other, but also that the values containing deviations caused by production errors or the like nearly coincide with each other.

Although the image projection devices according to the first to fourth exemplary embodiments are of front projection type, they can be applied to rear projection type.

For example, when the image projection devices according to the first and second embodiments are applied to the rear projection type, the overall structure shown in FIG. 6 including the screen used as the projection surface is accommodated in a housing. When the image projection device according to the third exemplary embodiment is applied to the rear projection type, the overall structure shown in FIG. 12 (including the screen) is accommodated in a housing. When the image projection device according to the fourth exemplary embodiment is applied to the rear projection type, the structure shown in FIG. 12 (in which beam generation means 1 is substituted with beam generation means 22 and that includes the screen) is accommodated in a housing. In any case, the screen has a diffusing characteristic. The inner surface of the screen (inner plane of the housing) is scanned with a light beam that passes through scanning means 3. When the light is transmitted through the screen, the light diffuses and thereby the observers observe the diffused light.

In the foregoing rear projection type image display device, when the beam generation means generates n (where n is an integer equal to or greater than 2) beams having different convergence angles, the screen is arranged between a position where a beam waist of the first beam having the lowest convergence angle is present and the position of the Rayleigh length on the convergence side of an n-th beam having the largest convergence angle.

The image production devices or image display devices according to the first to fourth embodiments each superimpose a plurality of beams having different convergence angles and thereby widen the range in which the projection surface on their optical path can be scanned with the convergent light and also suppress the beams from widening in the range. Thus, the speckle reduction effect and high precision images can be obtained by scanning the projection surface with convergent light.

(Fifth Exemplary Embodiment)

Figure 14:
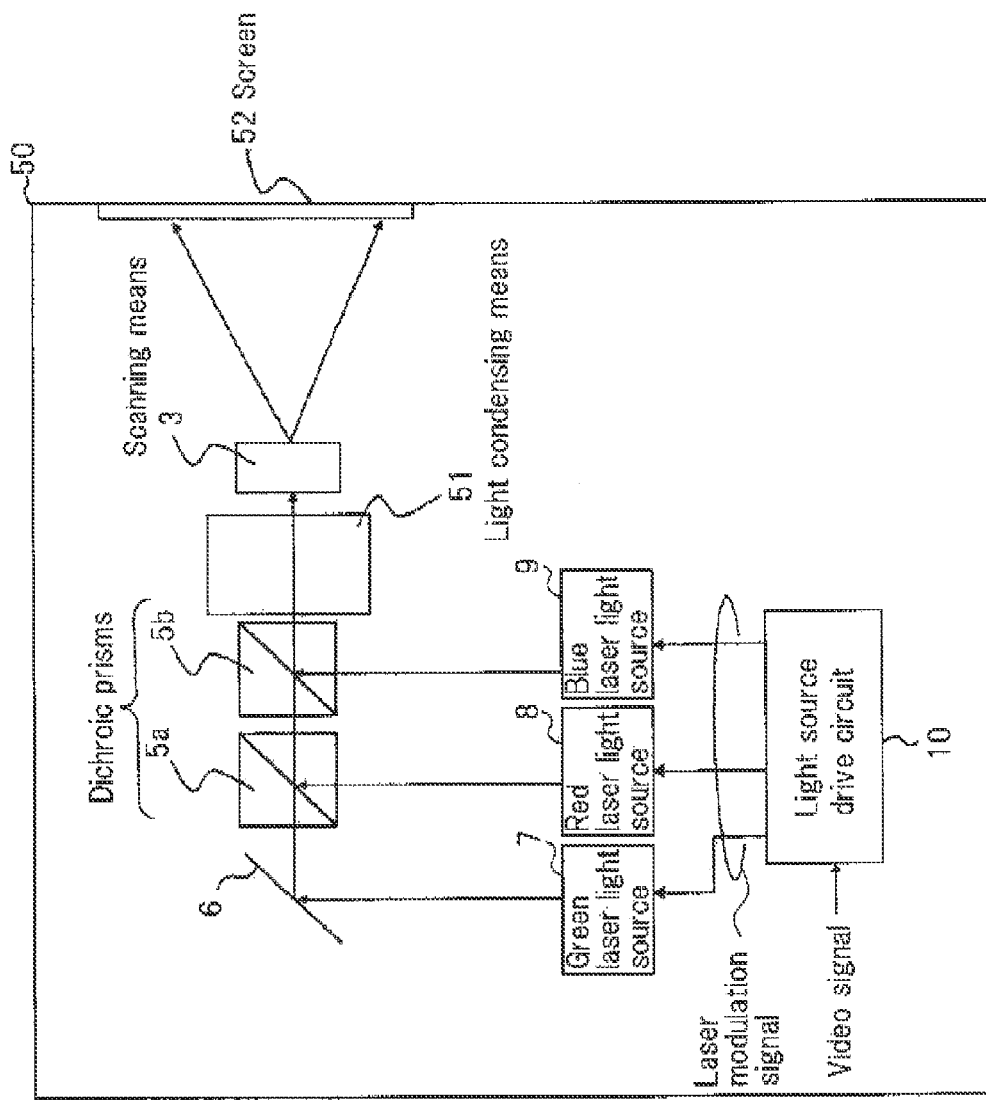
FIG. 14 is a schematic diagram showing a structure of principal sections of an image display device according to a fifth exemplary embodiment of the present invention.

FIG. 14 is a block diagram showing the structure of an image display device according to a fifth exemplary embodiment of the present invention.

Image display device 50 shown in FIG. 14 is different from the image display device shown in FIG. 6 in that beam generation means 1 is substituted with light condensing means 51 and in that screen 52 having a diffusion characteristic is provided as projection surface 4. Scanning means 3, dichroic prisms 5a, 5b, reflection mirror 6, green laser light source 7, red laser light source 8, blue laser light source 9, and light source drive circuit 10 for use in image display device 50 are basically the same as those shown in FIG. 6.

Light condensing means 51 condenses a light beam containing individual colors (red, green, and blue) composited by dichroic prisms 5a, 5b. Scanning means 3 scans screen 52 with the light beam that passes through light condensing means 51. When light transmits through screen 52, the light diverges and observers can observe the diverged light.

Screen 52 is arranged at a position closer to scanning means 3 than the beam waist of the light beam that passes through light condensing means 51. More preferably, screen 52 is arranged at a position closer to scanning means 3 than at a position where a beam waist of the light beam that passes through light condensing means 51 is present and in the range of the Rayleigh length on the convergence side of the light beam. As a result, screen 52 is always irradiated with a convergent beam and the diameter of the beam on screen 52 is $\sqrt{2}$ times the diameter of the beam where the beam waist is present.

Thus, since image display device 50 according to this embodiment always scans screen 52 with convergent light, image display device 50 can reduce speckles compared to the device in which the screen is arranged at a position where a beam waist is present or on the divergent side of the beam.

Since the diameter of the beam on screen 52 is at most $\sqrt{2}$ times the diameter of the beam where the beam waist takes place, highly precise images can be provided.

The foregoing individual embodiments are just examples of the present invention and thereby their structures may be changed without departing from the scope of the present invention.

In the individual embodiments, images projected or displayed on the projection surface include those that can be projected or displayed on the projection surface based on electronic data such as characters, figures, tables, and so forth as well as image data such as images and pictures.

The present invention can be applied to not only luster scanning, but also vector scanning.

With reference to the embodiments, the present invention has been described. However, it should be understood by those skilled in the art that the structure and details of the present invention may be changed in various manners without departing from the spirit of the present invention.

This application claims the benefits of priority based on Japanese Patent Application No. 2009-238088 for which application was submitted on Oct. 15, 2009 and incorporates by citation all of the disclosures of that application.

What is claimed is:

1. An image projection device comprising:
   beam generation unit that emits a plurality of beams in one direction such that said plurality of beams are superimposed on each other, a convergence angle of each beam being different from each other; and
   scanning unit that scans a projection surface with the beams emitted from said beam generation unit,
   wherein, from among said plurality of beams, with respect to a first beam and a second beam, said second beam includes a next larger convergence angle than that of said first beam in which an energy density of said first beam, at a position where a beam waist of said first beam is present, coincides with an energy density of said second beam at a position in a range from a position where a beam waist of said second beam is present to a position of Rayleigh length on a divergent side.

2. The image projection device as set forth in claim 1, wherein said beam generation unit includes:
   a splitting unit that splits an incident beam into a plurality of beams;
   a plurality of lenses that condense said plurality of beams passing through said splitting unit, respectively, a focal distance of each lens being different from each other; and
   a combining unit that combines individual beams condensed by said plurality of lenses to form a composite beam.

3. The image projection device as set forth in claim 1, wherein said beam generation unit includes a multi-focal lens including a plurality of Fresnel zone plates, a focal distance of each Fresnel zone plate being different from each other.

4. The image projection device as set forth in claim 1, wherein said beam generation unit superimposes said plurality of beams on a time division basis.

5. The image projection device as set forth in claim 4, wherein said beam generation unit includes:
   a splitting unit that splits an incident beam into a plurality of beams;

a plurality of lenses that condense said plurality of beams passing through said splitting unit, a focal distance of each lens being different from each other;

a combining unit that combines individual beams condensed by said plurality of lenses to form a composite beam;

a plurality of shutters arranged on individual optical paths of said plurality of beams that pass through said splitting unit; and a shutter switching unit that successively releases said plurality of shutters for every constant period.

6. The image projection device as set forth in claim 5, wherein said incident beam is a beam modulated corresponding to a video signal, and wherein said constant period is a period of frames that comprises said video signal.

7. The image projection device as set forth in claim 4, wherein said beam generation unit includes:

spatial optical modulator that spatially modulates an incident beam and generates image light corresponding to an input drive signal; and a drive circuit that successively supplies a plurality of drive signals that cause image light to be formed corresponding to a plurality of Fresnel zone plates to said spatial optical modulator for every constant period, a focal distance of each Fresnel zone plate being different from each other.

8. The image projection device as set forth in claim 7, wherein said incident beam is a beam modulated corresponding to a video signal, and wherein said constant period is a period of frames that comprises said video signal.

9. An image projection method, comprising:

combining, to form a composite beam, a plurality of beams such that an energy density on a cross plane of said plurality of beams becomes the highest, a convergence angle of each beam being different from each other and said cross plane being perpendicular to an optical axis; and scanning a projection surface with said composite beam, wherein, from among said plurality of beams, with respect to a first beam and a second beam, said second beam includes a next larger convergence angle than that of said first beam in which an energy density of said first beam, at a position where a beam waist of said first beam is present, coincides with an energy density of said second beam at a position in a range from a position where a beam waist of said second beam is present to a position of Rayleigh length on a divergent side.

10. The image projection method as set forth in claim 9, wherein said composite beam is formed by superimposing said plurality of beams on a time division basis.

11. An image projection method, comprising:

splitting an incident beam into a plurality of beams;

causing a plurality of lenses to condense said plurality of beams, a focal distance of each lens being different from each other;

combining individual beams condensed by said plurality of lenses to form a composite beam and scanning a projection surface with said composite beam, wherein a plurality of shutters arranged on individual optical paths of said plurality of beams are successively released for every constant period.

12. The image projection method as set forth in claim 11, wherein said incident beam is a beam modulated corresponding to a video signal, and wherein said constant period is a period of frames that comprises said video signal.

13. An image projection method, comprising:

causing a spatial optical modulator that generates image light corresponding to an input drive signal to spatially modulate an incident beam; and scanning a projection surface with the beam obtained by the modulation, wherein a plurality of drive signals that cause image light corresponding to a plurality of Fresnel zone plates s are supplied to said spatial optical modulator for every constant period, a focal distance of each Fresnel zone plate being different from each other.

14. The image projection method as set forth in claim 13, wherein said incident beam is a beam modulated corresponding to a video signal, and wherein said constant period is a period of frames that comprises said video signal.

15. An image display device, comprising:

a projection surface;

a light condensing unit that condenses an incident beam; and a scanning unit that scans said projection surface with the beam that passes through said light condensing unit, wherein said projection surface is arranged at a position closer to said scanning unit than at a position where a beam waist of the beam that passes through said light condensing unit is present and in a range defined by a Rayleigh length on a convergence side of the beam that passes through said light condensing unit.

* * * * *

UNITED STATES PATENT AND TRADEMARK OFFICE
CERTIFICATE OF CORRECTION

PATENT NO.        : 9,097,965 B2
APPLICATION NO.   : 13/502030
DATED             : August 4, 2015
INVENTOR(S)       : Hiroshi Imai It is certified that error appears in the above-identified patent and that said Letters Patent is hereby corrected as shown below:

In The Specification

Column 6, Line 29: Delete "(300 min)" and insert -- (300 mm) --

Column 11, Line 1: Delete "ρ," and insert -- π, --

In The Claims

Column 16, Line 30: In Claim 1, delete "beam" and insert -- a beam --

Column 16, Line 34: In Claim 1, delete "scanning" and insert -- a scanning --

Column 18, Line 27: In Claim 13, delete "plates s" and insert -- plates --

Signed and Sealed this
Twenty-sixth Day of January, 2016

Michelle K. Lee
*Director of the United States Patent and Trademark Office*